June 7, 1949. R. T. WOOD 2,472,641
LANDING GEAR FOR AIRCRAFT
Filed Sept. 9, 1947 4 Sheets-Sheet 1
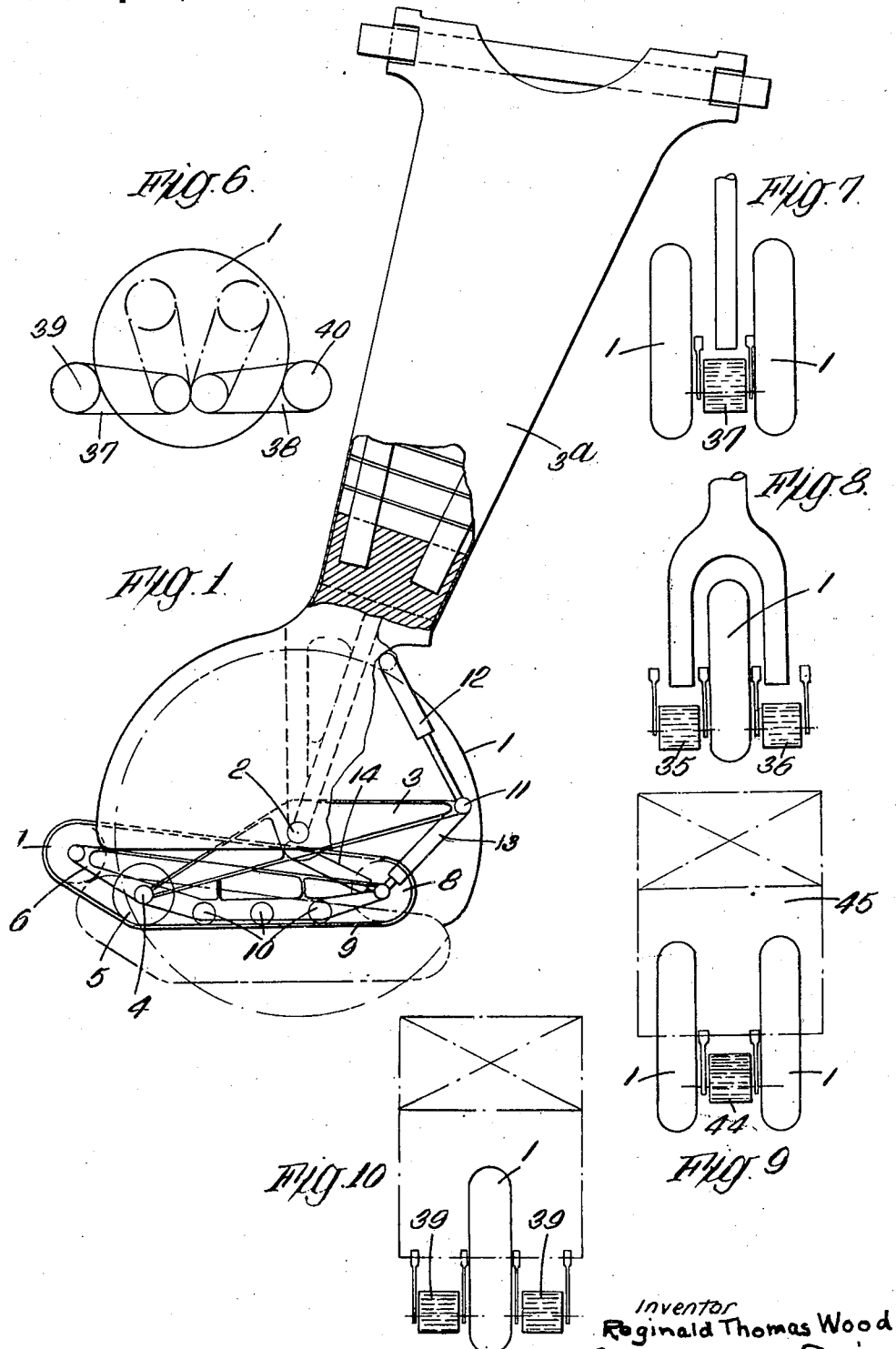

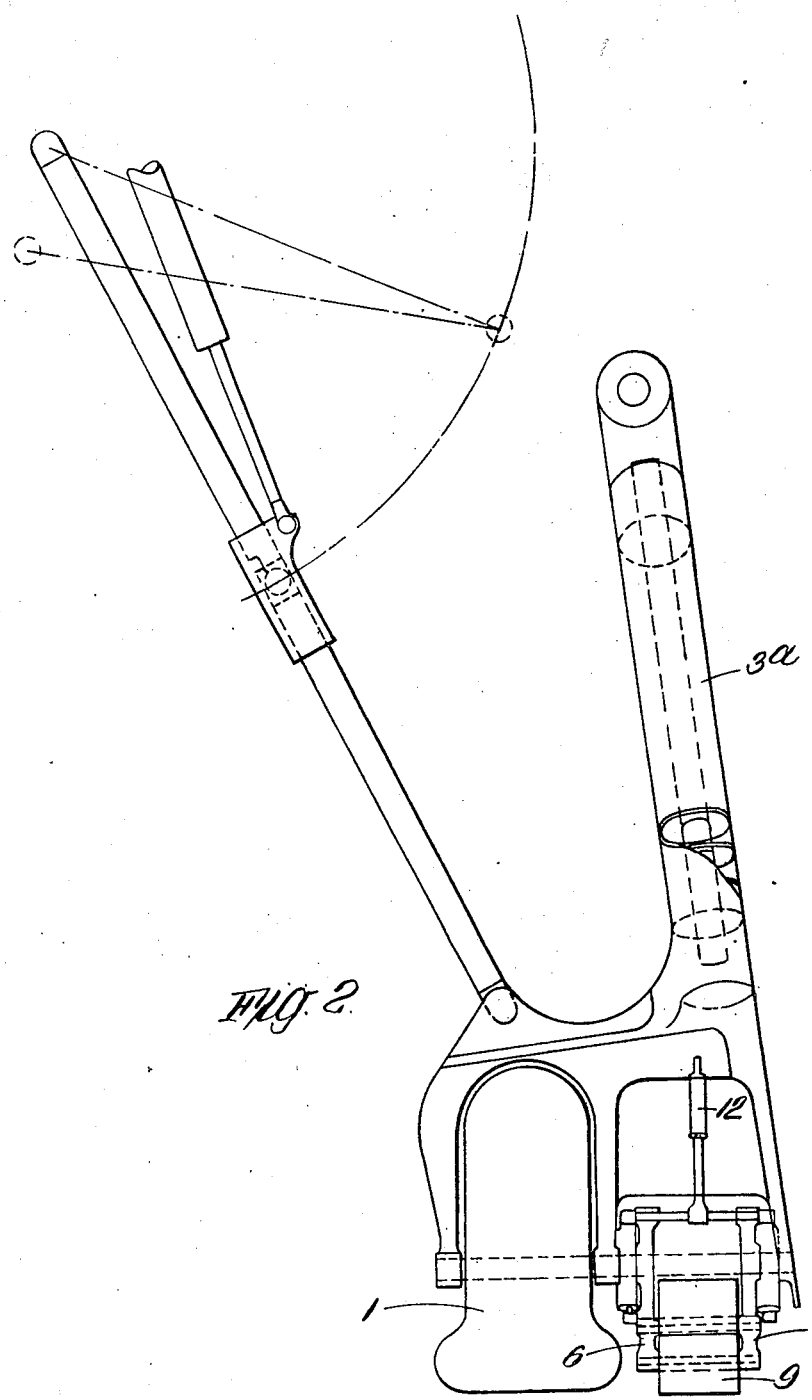

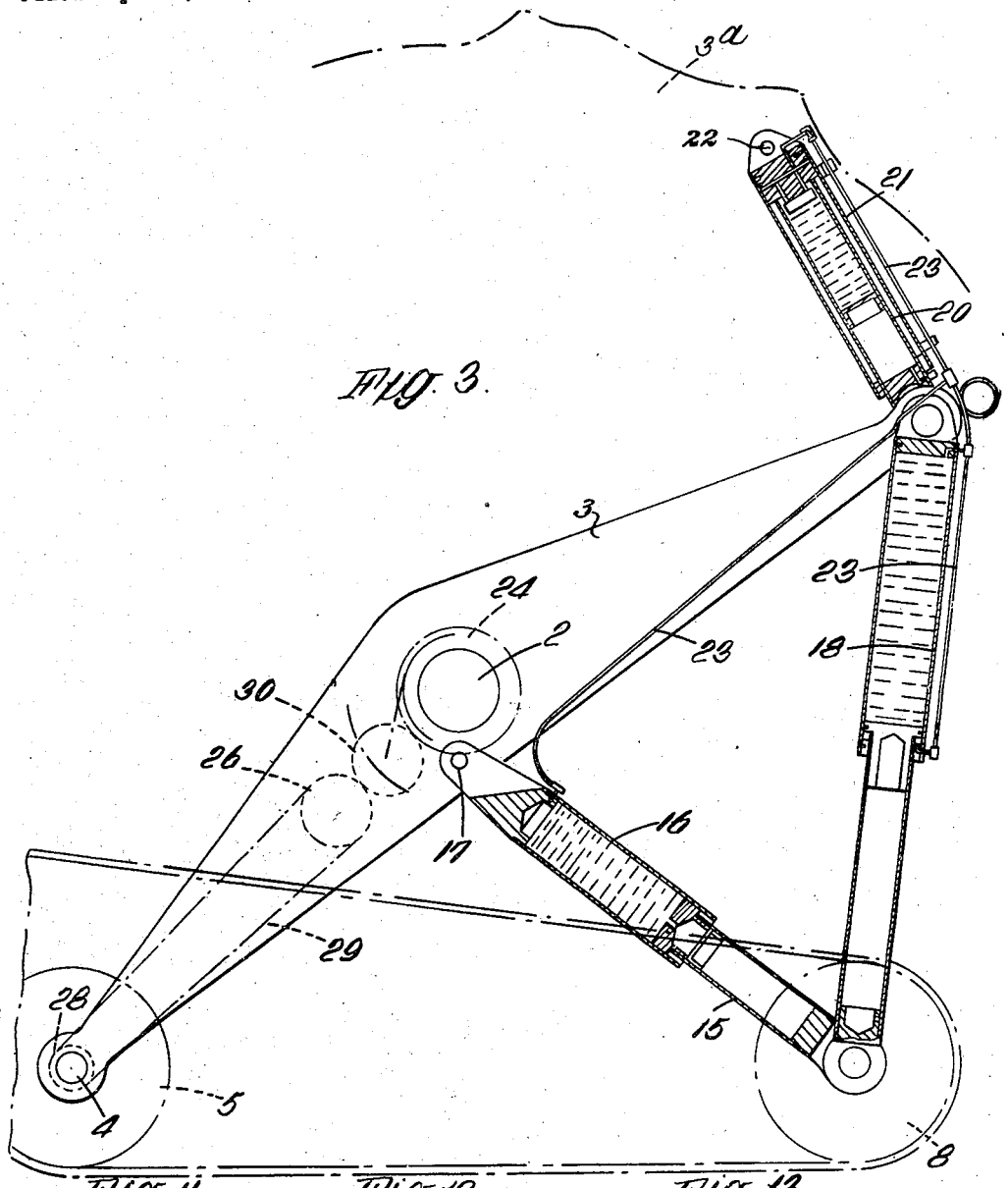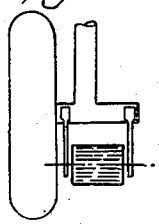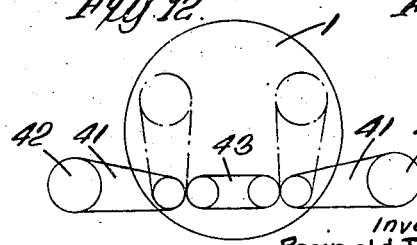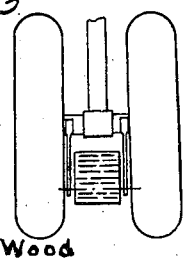

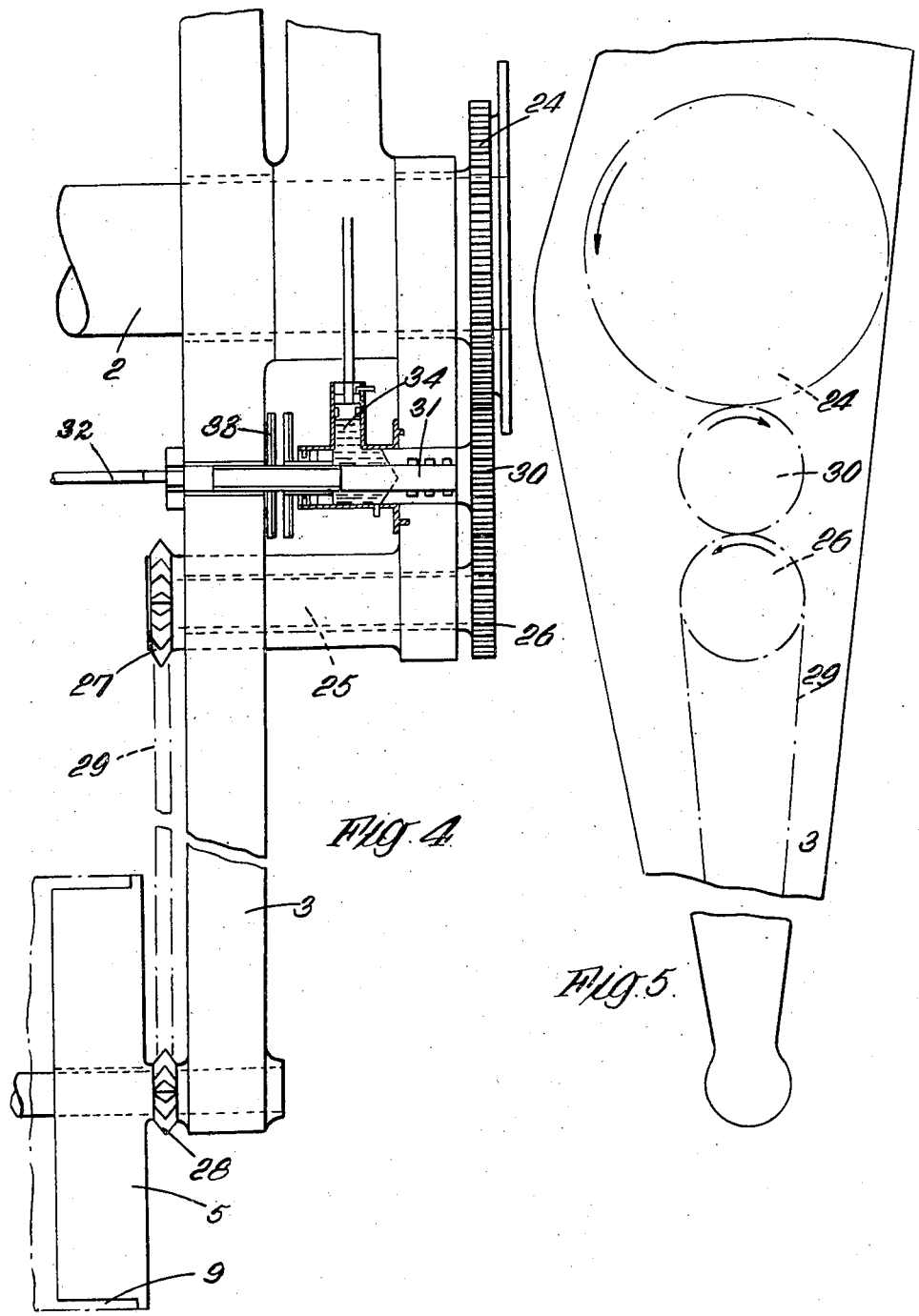

Patented June 7, 1949

2,472,641

UNITED STATES PATENT OFFICE 2,472,641

LANDING GEAR FOR AIRCRAFT

Reginald Thomas Wood, St. Albans, England

Application September 9, 1947, Serial No. 772,996
In Great Britain July 17, 1945

5 Claims. (Cl. 244—100)

This invention relates to improvements in landing gear for aircraft and is particularly concerned with landing gear for large aircraft.

The now very large size of aircraft, due to their considerable weight, require heavy and cumbersome landing gear. The most usual form of landing gear consists of a pair of single or twin wheels with pneumatic tyres, which have to be of large diameter, or a pair of endless track devices. Such large wheels are sometimes difficult to stow conveniently in a retractable landing gear and they are in themselves heavy. The endless track devices are more easily stowable but the weight is often greater, and at the present time it is not an established fact that such endless track devices are the full equivalent of pneumatic tyred wheels.

Now the principal object of the present invention is to provide a novel form of a landing gear for aircraft, particularly large aircraft, which is relatively light, robust, safe and efficient so that it is more convenient than either large pneumatic tyred wheels or endless track devices, and a further object of the invention is to so design the landing gear that it will reduce or eliminate any tendency for nosing over of aircraft.

The landing gear, according to the present invention comprises in combination at least one pneumatic tyred landing wheel and an endless track assembly both carried by the same undercarriage leg or equivalent part.

Preferably the endless track assembly is retractable from operation position to within the diameter of the wheel, and the arrangement is such that normally the endless track will only come into operation on compression of the pneumatic tyre.

There will normally be at least two such assemblies for each aircraft, one on each side of the major longitudinal axis of the aircraft, although there may be three such assemblies in a tricycle undercarriage or one such assembly as the nose wheel of a tricycle undercarriage.

According to a further feature of the invention each leg of the landing gear carries two pneumatic tyred wheels between which is located an endless track or an endless track assembly consisting of one or more endless tracks.

According to an alternative form of the present invention, each leg of the landing gear will carry one wheel on opposite sides of which is an endless track or an endless track assembly each consisting of one or more endless tracks.

According to a still further feature of the invention each endless track assembly consists of two or three or more separate aligned endless tracks adapted to be retractable to lie within the diameter of the wheel.

The endless track or the endless tracks are conveniently displaced from or retracted into operative position under the influence of pneumatic or hydraulic jacks or the equivalent. On landing, the endless track will be out of contact with the ground until there is appreciable compression of the pneumatic tyre on engaging the ground when the endless track or tracks come into use and relieve further loads which would otherwise be imposed on the pneumatic tyred wheels. The forward extension of the endless tracks or leading endless track minimises or prevents danger of the aircraft nosing over. Furthermore the endless track or tracks can be geared to rotate with the landing wheels so that on the tyre making contact it or they will commence to turn therewith thus giving the endless track or tracks an initial velocity before it or they actually come in contact with the ground, this having the effect of reducing dynamic track loading.

Still further according to the present invention, the endless track or endless tracks carried by an undercarriage leg are each resiliently mounted and adapted to absorb compression loads. In this way the landing assembly, i. e. wheel and track, may absorb the entire landing loads without the necessity of providing a shock absorber in the undercarriage leg, for example, the track may be carried by a suspension lever sytsem incorporating shock absorbers or other resilient members.

The endless track may be positioned entirely within the periphery of the wheel but will desirably extend at one or both ends somewhat beyond the periphery of the wheel. It is further preferred to so arrange the track that it will not make contact with the ground until normal maximum deflection of the tyre except where the tyre and track are intended to absorb all landing loads.

According to a further feature of the invention the endless track and the landing wheel may be connected to a driving mechanism through clutch means so that the track and wheel may be given an initial velocity by the driving mechanism before either contacts the ground.

The wheel or wheels may be provided with brakes as is customary, and the arrangement has a further advantage that the endless tracks may also be provided with brakes or be adapted to be somewhat resistant to displacement to set up a braking effort when such endless track or tracks come into operation.

It will be understood that the arrangement makes for greater safety since failure of the pneumatic tyre on normal aircraft landing gear could prove disastrous, whilst with the present arrangement such failure would not be nearly so serious. Furthermore, the pneumatic tyres may be inflated to higher pressure than can at present be safely contemplated.

In order that the invention may be more completely understood and readily put into practice convenient embodiments thereof will hereinafter be described with reference to the accompanying drawings in which—

Figure 1 shows a general arrangement of the device according to the present invention, Figure 2 shows a front elevation of Figure 1, Figure 3 shows an enlarged view of the endless track and suspension means therefor, Figure 4 shows a detail of the mechanism for connecting the landing wheel and endless track to driving means for imparting an initial velocity thereto, Figure 5 shows a side elevation of Figure 4, and Figures 6 to 13 show modifications of the arrangement of endless tracks and landing wheels.

Referring now to Figure 1, the landing wheel 1 is supported on an axle 2 carried by the undercarriage leg 3a of an aircraft. This leg may take any convenient form either as a single strut, as a twin strut, portal leg, articulated leg and so on, and may be retractable in any desired direction as may be convenient.

Pivotally mounted on the axle 2 is a lever 3, the pivotable point of the lever being arranged between its ends. One end 4 of the lever 3 is pivotally connected to the driving wheel 5 mounted on a chassis 6. This chassis is provided with wheels 7, 8, around which an endless track 9 passes additional wheels 10 being provided for holding the track in its operative position on the ground. The end 11 of the lever 3 is pivotally connected to resilient members 12 and 13, which will be described in detail hereinafter, the wheel 8 is also coupled to the lever 3 by means of a resilient member 14.

Referring more particularly to Figure 3, a plunger rod 15 of a fluid pressure operated jack is pivoted to the rear end of the chassis 6 preferably on the axle of the wheel 8, the cylinder 16 of the jack being pivoted to the lever arm 3 at 17, the pivot point 17 being located vertically below the centre of the landing wheel shaft 2 when the chassis 6 is lowered for contact of the endless track 9 with the ground.

The free end of the lever 3 is pivoted at 11 to the cylinder 18 of a fluid damper the plunger rod 19 of which is pivoted to the axle of the wheel 8 carried by the chassis. Also pivoted to the lever arm 3 is the plunger rod 20 of a fluid shock absorber of which the cylinder 21 is pivoted at 22 to the landing leg 3a of the aircraft.

By this construction the track 9 on contacting the ground will compress the members 16 and 18 and extend the member 21 so that fluid is forced from the cylinder 16 to the cylinder 21 and from the cylinder 18 to the cylinder 21.

Preferably the cylinders 21 and 16 are combined air and hydraulic shock absorbers and the cylinder 18 purely hydraulic.

By providing tubes 23 between the aforesaid cylinders some of the fluid from the top side of the piston in the cylinder 16 will pass to the cylinder 18 and some to the bottom side of the piston via these tubes.

In order to reduce the dynamic track loading it is preferred to provide the track 9 with an initial velocity before it actually comes into contact with the ground and a convenient construction for accomplishing this is shown in Figures 4 and 5 in which the track 9 is supported on the wheel 5 and the lever 3 is shown pivoted on the landing wheel axle 2. Mounted on the axle 2 is a gear wheel 24 and mounted on a countershaft 25 carried by the lever 3 is a gear wheel 26 and a sprocket wheel 27, a sprocket wheel 28 also being provided on the shaft of the wheel 5. These sprockets are connected by means of a chain 29.

Suitably disposed between the gear wheels 24 and 26 is a gear wheel 30 carried on a shaft 31 and coupled to a flexible drive 32 through an hydraulically operated clutch 33. The hydraulic mechanism being of the conventional form and illustrated by the reference 34.

In operation and assuming that the clutch 33 is disconnected, the landing wheel carried on the shaft 2 upon touching the ground will commence to rotate at the same time turning the gear wheel 24 which in turn drives the wheels 30 and 26 thereby rotating the sprockets 27 and 28 and the latter being mounted on the same shaft as the wheel 5 will rotate this wheel and drive the track 9 thereby giving the track 9 an initial velocity during the period from the time when the landing wheel touches the ground until it is compressed sufficiently for the track also to contact the ground.

Alternatively, the landing wheel and endless track may be given an initial velocity before either contacts the ground. In order to do so the clutch 33 is brought into operation by means of the hydraulic gear 34 and as previously stated the clutch is connected to a flexible drive 31a. In this manner the flexible drive 31a will rotate the gear wheel 30 which in turn will drive the shaft 2 carrying the landing wheel through the gear wheel 24 and at the same time will rotate the track driving wheel 5 through the gear wheel 26 and sprocket wheels 27, 28 and chain 29. This arrangement is shown clearly in Figures 4 and 5 of the drawings.

In the form of the invention so far described, each landing leg has one ground engaging or landing wheel and one endless track passing around a small wheel situated within the circumference of the landing wheel and around another wheel also normally within the circumference of the wheel but displaceable to a position forwardly of the periphery thereof, so that the straight line ground engaging portion of the track lies parallel to the ground at a distance therefrom approximately equal to 60–70% compression and deformation of the pneumatic tyre on the landing wheel. In a modified form of this construction (Figure 8) there are two endless tracks 35, 36, of similar form and disposition, which are arranged on opposite sides of the landing wheel 1, and in a further alternative form (not shown) there are two endless tracks which extend in opposite directions on the same side of the landing wheel whilst this arrangement may be combined with that previously described to provide four tracks, two on each side of the landing wheel and those on the common side being in alignment and extending in opposite directions.

In a modified construction (Figures 6 and 7), the endless track assembly consists of two endless tracks 37, 38 working in alignment and each passing around a pair of wheels 39, 40 both movable from a retracted position shown in dot and dash lines, Figure 6, within the circumference of the landing wheel 1 into operative positions, when the leading wheel of the leading endless track projects in front of the periphery of the pneumatic tyre of the landing wheel, and the other wheels of the endless tracks hold them with their ground engaging surfaces parallel to the ground as in the embodiment previously described. This arrangement may be duplicated one on each side of the landing wheel or one behind the other to extend in opposite directions, or a combination thereof may be provided on opposite sides of the landing wheel. In a further modification of this embodiment a two endless track forwardly extending assembly may be associated with a rearwardly extending single track, and again there may be a duplication of such arrangement on opposite sides of a landing wheel.

In a third general form there are at least two endless tracks of which one is permanently positioned within the diameter of the wheel and the one wheel at the other endless track is displaceable from retracted position within the diameter of the landing wheel into forward operative position. In a modification of this form (Figures 12 and 13) an endless track 41 with a displaceable wheel 42 may be provided at each end of the fixed endless track 43 so that the three endless tracks in operative position have their ground engaging portions aligned and the outermost tracks extend forwardly and rearwardly of the periphery of the pneumatic tyre on the landing wheel 1. These forms of mechanism may also be duplicated and arranged to run side by side on opposite sides of the landing wheel. The retracted position of the tracks 41 is shown in dot and dash lines in Figure 12.

The modification shown in Figure 9 comprises a pair of landing wheels 1 and an endless track assembly 44 situated between the wheels, the wheels and track assembly being carried by a portal frame indicated at 45. Figure 10 also provides a portal frame 45 but in this modification there is a single landing wheel 1 with an endless track assembly arranged on either side thereof, and Figure 11 shows a construction as already described applied to a cantilever or semi-cantilever strut.

In all cases where there is only a single endless track or the two or more tracks are all in alignment, it is preferred to provide only a single pneumatic tyred wheel therebetween.

I claim:

1. Landing gear for aircraft including in combination, a support for the aircraft when on the ground, at least one pneumatic tyred landing wheel, at least one endless track both carried by said support, a chassis, wheels on said chassis for supporting and driving said track, an axle for said landing wheel, a lever pivoted between its ends to said axle, one end of said lever being connected to the forward end of said chassis and the other end of said lever being connected to the rear end of said chassis, an axle for said landing wheel, a gear wheel mounted on said axle, a countershaft carried by said lever, a gear wheel and sprocket wheel carried by said countershaft, a track driving wheel on said chassis a sprocket wheel mounted on said driving wheel axle, a chain connecting said sprocket wheels, a gear wheel mounted between and connecting the two first mentioned gear wheels, driving means, and a hydraulically actuated clutch for connecting said last mentioned gear wheel to said driving means for imparting an initial velocity to the landing wheel and to the track before either contacts the ground.

2. Landing gear for aircraft including in combination, a support for the aircraft when on the ground, two pneumatic tyred landing wheels, an endless track assembly situated between said wheels, said landing wheels and track assembly being carried by said support, an axle for said landing wheel, a lever pivoted between its ends on said axle, a chassis for said track, driving wheels on said chassis for driving said track, said chassis being pivotally connected at its forward end to one end of said lever, a pair of hydraulic jacks pivotally connected to the other end of said lever, one of said jacks connecting said lever to said support and the other of said jacks connecting said lever with the rear end of said chassis, a hydraulic jack connecting said rear end of the chassis to a point between the ends of said lever, and means for by-passing some of the fluid from one hydraulic jack to the other, said jacks permitting said track assembly to be displaced into its operative position.

3. Landing gear for aircraft including in combination a support for the aircraft when on the ground, two pneumatic tyred landing wheels, an endless track assembly situated between said wheels, said track assembly and wheels being carried by said support, a chassis, wheels on said chassis for supporting and driving said track, an axle for said landing wheel, a lever pivoted between its ends to said axle, one end of said lever being connected to the forward end of said chassis and the other end of said lever being connected to the rear end of said chassis, an axle for said landing wheel, a gear wheel mounted on said axle, a countershaft carried by said lever, a gear wheel and sprocket wheel carried by said countershaft, a track driving wheel on said chassis a sprocket wheel mounted on said driving wheel axle, a chain connecting said sprocket wheels, a gear wheel mounted between and connecting the two first mentioned gear wheels, driving means, and a hydraulically actuated clutch for connecting said last mentioned gear wheel to said driving means for imparting an initial velocity to the landing wheel and to the track before either contacts the ground.

4. Landing gear for aircraft including in combination a support for the aircraft when on the ground, a pneumatic tyred wheel, an endless track assembly situated on either side of said wheel, said wheel and track assemblies being carried by said support, an axle for said landing wheel, a lever pivoted between its ends on said axle, a chassis for said track, driving wheels on said chassis for driving said track, said chassis being pivotally connected at its forward end to one end of said lever, a pair of hydraulic jacks pivotally connected to the other end of said lever, one of said jacks connecting said lever to said support and the other of said jacks connecting said lever with the rear end of said chassis, a hydraulic jack connecting said rear end of the chassis to a point between the ends of said lever, and means for by-passing some of the fluid from one hydraulic jack to the other, said jacks permitting said track assembly to be displaced into its operative position.

5. Landing gear for aircraft including in combination a support for the aircraft when on the ground, a pneumatic tyred landing wheel, an endless track assembly situated on either side of said wheel, said wheel and track assemblies being carried by said support, a chassis, wheels on said chassis for supporting and driving said track, an axle for said landing wheel, a lever pivoted between its ends to said axle, one end of said lever being connected to the forward end of said chassis and the other end of said lever being connected to the rear end of said chassis, an axle for said landing wheel, a gear wheel mounted on said axle, a countershaft carried by said lever, a gear wheel and sprocket wheel carried by said countershaft, a track driving wheel on said chassis a sprocket wheen mounted on said driving wheel axle, a chain connecting said sprocket wheels, a gear wheel mounted between and connecting the two first mentioned gear wheels, driving means, and a hydraulically actuated clutch for connecting said last mentioned gear wheel to said driving means for imparting an initial velocity to the landing wheel and to the track before either contacts the ground.

REGINALD THOMAS WOOD.

REFERENCES CITED

The following references are of record in the file of this patent:

UNITED STATES PATENTS

| Number | Name | Date |
|---|---|---|
| 2,281,351 | Dowty | Apr. 28, 1942 |
| 2,376,621 | Reed | May 22, 1945 |

FOREIGN PATENTS

| Number | Country | Date |
|---|---|---|
| 360,308 | Great Britain | Nov. 5, 1931 |
| 525,280 | France | June 1, 1921 |